May 27, 1958     R. D. JESSEE     2,836,771
NEGATIVE SEQUENCE VOLTAGE SENSING NETWORK
Filed Aug. 8, 1956
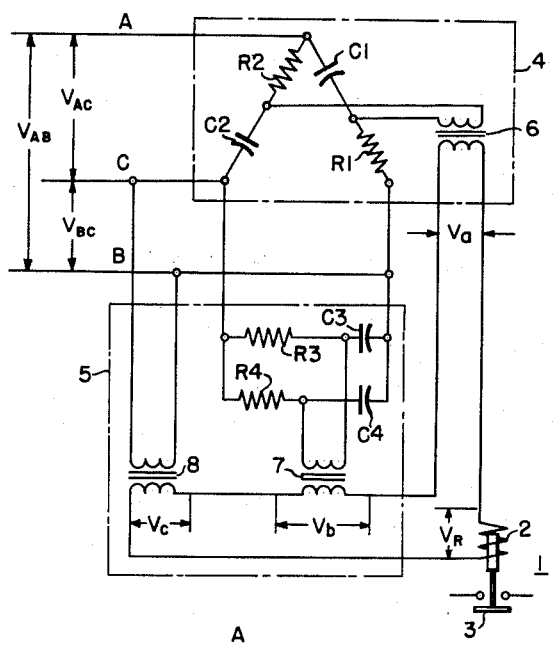
Fig.1.
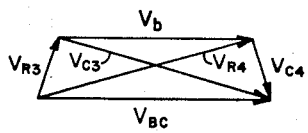
Fig.3A.
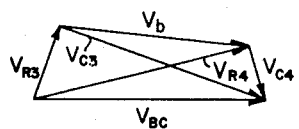
Fig.3B.
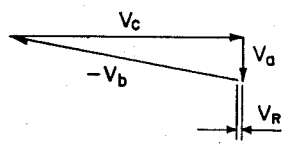
Fig.4.
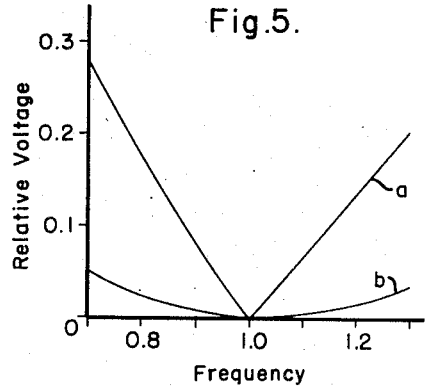
Fig.2A.
Fig.2B.
Fig.2C.
Fig.5.

United States Patent Office 2,836,771
Patented May 27, 1958

2,836,771

NEGATIVE SEQUENCE VOLTAGE SENSING NETWORK

Ralph D. Jessee, Lima, Ohio, assignor to Westinghouse Electric Corporation, East Pittsburgh, Pa., a corporation of Pennsylvania Application August 8, 1956, Serial No. 602,836

11 Claims. (Cl. 317—47)

The present invention relates to a negative sequence voltage sensing network, and more particularly to a network or circuit for sensing the negative sequence component of a three-phase voltage which is substantially unaffected by variations in frequency.

In electric power systems it is usually necessary to provide accurate and reliable means for detecting faults so that the system and its connected loads can be protected by isolating the affected portion of the system, or by other appropriate means. In a three-phase system, faults such as line-to-line or line-to-ground faults result in unbalancing the line voltages, and can be detected by relays or other devices responsive to the negative sequence components of the line voltage. This method of fault detection has been extensively used, but the usual sequence filters or networks which have been used to detect the presence of negative sequence voltages are sensitive to frequency and give a false indication, when positive sequence components only are present, if the frequency varies substantially from the nominal value for which the filter is designed. This frequency sensitivity is not important in the case of devices used on public utility transmission or distribution lines or industrial power systems, where the frequency is closely regulated and is not permitted to deviate substantially from the nominal value. In isolated systems, however, such as the alternating-current power systems used on aircraft, considerable variation of the frequency may occur, and in aircraft systems, under some conditions, the frequency may vary by as much as 20% or more from the nominal value. This frequency variation causes erroneous operation of conventional negative sequence relays, and has made it impractical to utilize this method of fault detection in aircraft systems, although it would be very desirable because such a device can be made very small and light in weight.

The principal object of the present invention is to provide a negative sequence voltage sensing network or circuit for actuating a relay or other control device in response to the negative sequence components of a three-phase voltage and which is substantially unaffected by variations in frequency.

Another object of the invention is to provide a negative sequence voltage sensing network which includes a filter circuit for producing an output voltage in response to the negative sequence component of a three-phase line voltage, and a frequency compensating circuit for producing a voltage nearly equal and opposite to the output voltage produced by the filter circuit in response to the positive sequence component when the frequency varies from the nominal value for which the circuit is designed.

A further object of the invention is to provide a negative sequence voltage sensing network which is substantially unaffected by frequency variation and which provides an output voltage proportional to the negative sequence component of a three-phase voltage, that is, a voltage signal which varies continuously with a varying input negative sequence voltage component.

A more specific object of the invention is to provide a negative sequence voltage sensing device including a filter circuit which produces an output voltage in response to the negative sequence component of a three-phase line voltage but which is frequency sensitive so that an undesired output voltage is produced in response to the positive sequence component when the frequency varies from a nominal value, together with a frequency compensating circuit which provides an output voltage varying in phase position with frequency which is combined with a voltage of fixed phase position in such a way that a voltage is produced nearly equal and opposite to the output voltage of the filter circuit due to the positive sequence component.

Other objects and advantages of the invention will be apparent from the following detailed description, taken in connection with the accompanying drawing, in which:

Figure 1 is a schematic diagram showing a preferred embodiment of the invention;

Figs. 2A, 2B and 2C are vector diagrams illustrating the operation of the filter portion of the network;

Figs. 2A and 3B are vector diagrams illustrating the operation of the frequency compensating portion of the network;

Fig. 4 is a vector diagram illustrating the effect of the frequency compensation; and Fig. 5 shows two curves illustrating the effectiveness of the frequency compensation.

A preferred embodiment of the invention is shown in Fig. 1 which shows a network or circut for sensing the negative sequence component of a three-phase voltage. The network may be energized from a three-phase source connected to the network by phase conductors designated A, B and C. The network is intended to be connected to a three-phase line for the purpose of detecting faults on the line, such as line-to-line or line-to-ground faults, the existence of which is evidenced by unbalance of the line voltages so that a negative sequence component appears in the three-phase voltage. The output of the network may be applied to actuate any desired type of control device, such as a relay 1, for example, having an operating coil 2 and contacts 3 which may be connected in any desired manner to effect a desired response to the existence of a fault on the line. Other types of control devices, such as static devices, may be utilized instead of a relay, and the network may be used for purposes such as regulation as well as for obtaining merely an on-off type of response.

The negative sequence voltage sensing network consists of a negative sequence filter circuit 4 and a frequency compensating circuit 5. The filter circuit 4 is energized from two of the three phases and includes a capacitor C1 and a resistor R1 connected in series and connected across phase AB. The filter circuit also includes a second capacitor C2 and a second resistor R2 connected in series and connected across phase AC. The values of these resistors and capacitors are preferably chosen so that at the nominal frequency for which the circuit is designed, which may, for example, be 400 cycles per second, the reactance of capacitor C1 is equal to the resistance of resistor R2, and the reactance of capacitor C2 is equal to the resistance of resistor R1. The values are also so chosen that, at the nominal frequency, the voltage drop across the resistor R2 leads the applied voltage $V_{CA}$ by 30° and the voltage drop across the capacitor C1 lags the applied voltage $V_{AB}$ by 30°. The voltages across the capacitor C1 and resistor R2 are added vectorially to obtain an output voltage $Va$. This resultant voltage is applied to an isolating transformer 6, which may have a one-to-one ratio, and which has its primary winding connected across the capacitor C1 and resistor R2, as shown, so that the output voltage $Va$ of the filter circuit appears across the secondary winding of the transformer 6. The purpose of the transformers is to isolate the circuit components so that the voltages can be added.

The operation of the filter circuit 4 in responding to the negative sequence voltage will be understood from the vector diagram of Fig. 2A. In this figure, the voltage $V_{C1}$ across the capacitor C1 and the voltage $V_{R1}$ across the resistor R1 are shown as components of the energizing phase voltage $V_{AB}$, and the voltages $V_{C2}$ and $V_{R2}$ across the capacitor C2 and resistor R2 are shown as components of the energizing phase voltage $V_{CA}$. The phase voltages $V_{AB}$ and $V_{CA}$ are shown in the phase positions which will exist if only negative sequence voltage is applied to the line, and it will be seen that the addition of the voltages $V_{C1}$ and $V_{R2}$ produces an output voltage $Va$, which is in phase with the third phase voltage $V_{BC}$, and which is proportional to the negative sequence voltage component so that it provides a reliable signal voltage for the operation of a control device in response to the presence of a negative sequence voltage component in the line voltage.

Fig. 2B shows the relations of the voltages when only a positive sequence voltage is applied to the filter circuit. In this figure, the phase voltages $V_{AB}$ and $V_{CA}$ are shown in the position which will exist when only positive sequence voltage is applied, and it will be seen that under these conditions the voltages $V_{C1}$ and $V_{R2}$ are equal in magnitude and opposite in phase, so that the output voltage of the filter is zero, and no signal is derived from the filter when only positive sequence components are applied to it. Thus, as long as the frequency remains constant at its nominal value, the filter circuit 4 has no output when positive sequence voltages only are applied to it, that is, under normal conditions, but provides an output voltage proportional to the negative sequence voltage component when a negative sequence component appears, that is, when the line voltages become unbalanced.

If the frequency varies from the nominal value, however, the filter circuit 4 will give an erroneous output voltage with only positive sequence voltages applied. Fig. 2C is a vector diagram showing the various voltages at a frequency higher than the nominal frequency for which the filter is designed. At this higher frequency, the reactances of the capacitors C1 and C2 decrease so that the voltages $V_{C1}$ and $V_{C2}$ decrease, and the vector diagram of Fig. 2B becomes distorted to that shown in Fig. 2C. It will be seen that since the voltages $V_{C1}$ and $V_{R2}$ are no longer equal and opposite, an output voltage $Va$ appears in response to positive sequence voltage. Voltage $Va$ is of substantial magnitude and nearly in quadrature relation with the third phase voltage $V_{BC}$. If the frequency decreases below the nominal value, the voltages $V_{C1}$ and $V_{C2}$ increase and the vector diagram is distorted in the opposite direction so that an output voltage again appears nearly in quadrature with the voltage $V_{BC}$ but opposite in direction to that shown in Fig. 2C.

Thus, the filter circuit 4 is frequency sensitive and if used by itself on a system such as an aircraft system, where considerable frequency variation may occur, an erroneous output voltage would appear when the frequency varied substantially from the nominal value, causing undesired operation of the relay 1 or other control device. This frequency error is illustrated by the curve $a$ of Fig. 5 in which the relative output voltage $Va$ of the filter circuit 4, with positive sequence voltages only applied, is plotted against the ratio of actual frequency to nominal frequency. It will be seen from this curve that the filter circuit 4 has zero output voltage for positive sequence voltages at the nominal frequency, but that when the frequency varies substantially in either direction a relatively large output voltage occurs.

The frequency compensating circuit 5 is provided to compensate for the undesired output voltage of the filter 4 due to positive sequence components of the applied voltage. The compensating circuit 5 is energized from the third phase voltage $V_{BC}$ and includes two parallel branches, each consisting of a resistor and a capacitor in series. One branch of the compensating circuit comprises a capacitor C3 and resistor R3, while a capacitor C4 and resistor R4 make up the other parallel branch. The values of these resistors and capacitors are chosen so that, at the nominal frequency, the ratio of the resistance of resistor R3 to the reactance of capacitor C3 is equal to the ratio of the reactance of capacitor C4 to the resistance of resistor R4. For symmetry, the reactance of capacitor C3 is preferably made equal to the resistance of resistor R4, and the reactance of capacitor C4 equal to the resistance of resistor R3. The resistance of resistor R4 is made considerably greater than the resistance of resistor R3, a ratio of four to one being suitable, although this ratio is not critical and other values might be used.

The voltages across the resistors R3 and R4 are subtracted vectorially to provide a frequency sensitive voltage $Vb$. This is preferably done through an isolating transformer 7 having its primary winding connected across the resistors, as shown, so that the voltage $Vb$ appears across its secondary. The vector diagrams of Figs. 3A and 3B illustrate the effect of frequency on the voltage $Vb$. Fig. 3A shows the relations of the voltages in the compensating circuit at the nominal frequency, with the voltages $V_{C3}$ and $V_{R3}$ across capacitor C3 and resistor R3 shown as components of the energizing voltage $V_{BC}$, and the corresponding voltages $V_{C4}$ and $V_{R4}$ across the capacitor C4 and resistor R4 similarly shown. The frequency sensitive voltage $Vb$ is the vector difference of the voltages $V_{R3}$ and $V_{R4}$ and at the nominal frequency this voltage is in phase with the applied voltage $V_{BC}$.

Fig. 3B shows the same voltages when the frequency is higher than nominal frequency. Under these conditions, the voltages $V_{C4}$ and $V_{C3}$ are decreased and the vector diagram is changed as shown in Fig. 3B. It will be seen that the voltage $Vb$, while it does not change greatly in magnitude, changes its phase position relative to the applied voltage $V_{BC}$ by a substantial angle. A decrease in the frequency obviously would cause an opposite effect on the voltage $Vb$, changing its phase position with respect to $V_{BC}$ in the opposite direction.

In order to provide a compensating voltage to cancel the erroneous output voltage of the filter circuit 4, a reference voltage $Vc$ is also provided in the frequency compensating circuit and is combined with the frequency sensitive voltage $Vb$. The reference voltage $Vc$ is a substantially constant voltage in phase with the energizing voltage $V_{BC}$, and may be obtained by an isolating transformer 8 having its primary winding connected across the voltage $V_{BC}$ so that the reference voltage $Vc$ appears across the secondary winding. The magnitude of voltage $Vc$ is selected to be equal to $Vb$ at nominal frequency. The frequency sensitive voltage $Vb$ is substracted vectorially from the fixed reference voltage $Vc$ to provide a compensating voltage which will be nearly equal and opposite to the output voltage $Va$ of the filter circuit 4 due to the positive sequence voltage component. For this purpose, the secondaries of the transformers 7 and 8 may be connected in series, as shown, with the proper relative polarity, and the output voltage $Va$ of the filter circuit 4 is connected in series with the voltages $Vb$ and $Vc$ to obtain a resultant voltage $V_R$, which is the final output voltage of the network and which is applied to the relay coil 2 or other control device. The voltages $Vb$ and $Vc$ are combined so as to be equal and opposite at the nominal frequency, and as the frequency changes, the phase position of the voltage $Vb$ changes, producing a compensating voltage nearly in quadrature with $Vc$ and increasing in magnitude as the frequency changes away from the nominal value.

The effect of the frequency compensating circuit 5 is illustrated in Fig. 4, which shows the vector subtraction of the voltages $Vc$ and $Vb$ and the addition of the filter circuit output voltage $Va$, which, as shown in Fig. 2C and previously mentioned, is nearly in quadrature with the voltage $V_{BC}$ and thus with the reference voltage $Vc$. It will be apparent that the compensating voltage provided by the subtraction of the voltages $Vb$ and $Vc$ will be nearly equal and opposite to the voltage $Va$, as shown in Fig. 4, and when the voltages are combined in the manner shown, the resultant voltage $V_R$ will be extremely small and is negligible.

Thus, in operation, variation of the frequency from the nominal value causes the filter circuit 4 to have an output voltage $Va$ in response to the positive sequence voltage, which is undesired. Variation of the frequency also causes the voltage $Vb$ of the compensating circuit 5 to vary in phase position relative to the fixed reference voltage $Vc$, so that the vector subtraction of these two voltages provides a compensating voltage which is always very nearly equal and opposite to the undesired voltage $Va$, since both the voltage $Va$ and the phase angle of the voltage $Vb$ vary together with frequency. The effect of the compensating circuit is illustrated by the curve $b$ of Fig. 5, which shows the relative output voltage $V_R$ of the entire network due to the positive sequence voltage only. It will be seen that while the compensation is not quite complete, the error, even for large variations of frequency, is quite small and the voltage is small enough to be negligible since it will not cause operation of the relay. The compensating circuit 5 has little effect on the operation of the circuit to provide the desired output voltage when a negative sequence component of the line voltage is present, since it is apparent from Fig. 2A that under these conditions, the output voltage $Va$ is relatively large and is in phase with the voltage $V_{BC}$ so that the frequency compensating circuit has little effect on the output voltage due to the negative sequence component.

It should be apparent that a negative sequence voltage sensing network has been provided which is very suitable for use on aircraft electrical systems, or for other applications where substantial variations in frequency may occur. The frequency compensating circuit included in this network substantially compensates any output voltage due to the positive sequence component and thus makes it possible to use this network for fault detection on systems where the frequency may vary without any possibility of false operation due to frequency variation. The output voltage of the network due to negative sequence voltage is proportional to the negative sequence input, and the network may thus be used for many control purposes by using it to supply appropriate types of control devices in place of the relay 1 which has been shown only for illustration.

A particular embodiment of the invention has been shown and described for the purpose of illustration, but it will be apparent that various modifications and other embodiments are possible within the scope of the invention. It will also be apparent that the circuit may be used in any desired manner to actuate a control device of any type which might be a static device, to effect any desired response to the presence of unbalanced voltages. The invention, therefore, is not limited to the specific arrangement shown but includes all equivalent embodiments and modifications.

I claim as my invention:

1. A negative sequence voltage sensing network for a three-phase alternating current line, said network comprising a filter circuit for producing an output voltage in response to negative sequence components of the line voltage, said filter circuit also producing an output voltage in response to positive sequence components of the line voltage when the frequency varies from a nominal value, a frequency compensating circuit adapted to provide a voltage substantially equal and opposite to the output voltage of the filter circuit due to positive sequence components, and means for vectorially combining the voltage provided by the frequency compensating circuit and the output voltage of the filter circuit.

2. A negative sequence voltage sensing network for a three-phase alternating current line, said network comprising a filter circuit for producing an output voltage in response to negative sequence components of the line voltage, said filter circuit also producing an output voltage in response to positive sequence components of the line voltage when the frequency varies from a nominal value, a frequency compensating circuit adapted to provide a voltage component which varies in phase with frequency, means for providing a voltage component of substantially fixed phase, means for combining said voltage components to provide a resultant voltage substantially equal and opposite to the output voltage of the filter circuit due to positive sequence components, and means for vectorially combining said resultant voltage and the output voltage of the filter circuit.

3. A negative sequence voltage sensing network for a three-phase alternating current line, said network comprising a filter circuit for producing an output voltage in response to negative sequence components of the line voltage, said filter circuit also producing an output voltage in response to positive sequence components of the line voltage when the frequency varies from a nominal value, a frequency compensating circuit adapted to provide a voltage component which varies in phase with frequency, means for providing a voltage component of substantially fixed phase, and means for combining said voltage components vectorially with the output voltage of the filter circuit to substantially cancel any output voltage due to positive sequence components.

4. A negative sequence voltage sensing network for a three-phase alternating current line, said network comprising a filter circuit energized from two of the phase voltages of said line to produce an output voltage in response to negative sequence components of the line voltage, said filter circuit also producing an output voltage nearly in quadrature relation with the third phase voltage of the line in response to positive sequence components of the line voltage when the frequency varies from a nominal value, a frequency compensating circuit energized from said third phase voltage and adapted to produce a voltage substantially equal and opposite to the output voltage of the filter circuit due to positive sequence components, and means for vectorially combining the voltage produced by the frequency compensating circuit and the output voltage of the filter circuit.

5. A negative sequence voltage sensing network for a three-phase alternating current line, said network comprising a filter circuit energized from two of the phase voltages of said line to produce an output voltage in response to negative sequence components of the line voltage, said filter circuit also producing an output voltage nearly in quadrature relation with the third phase voltage of the line in response to positive sequence components of the line voltage when the frequency varies from a nominal value, and a frequency compensating circuit including means for providing a fixed voltage component in phase with said third phase voltage and a voltage component equal and opposite to the fixed voltage component at the nominal frequency, said last-mentioned voltage component changing in phase position when the frequency changes, and means for adding said voltage components vectorially to the output voltage of the filter circuit to substantially cancel any output voltage due to positive sequence components of the line voltage.

6. A negative sequence voltage sensing network for a three-phase alternating current line, said network comprising a filter circuit having a first capacitor and a first resistor connected in series across one phase of the line, a second resistor and a second capacitor connected in series across a second phase of the line, and means for combining the voltages across said first capacitor and second resistor to produce an output voltage in response to negative sequence components of the line voltage, said filter circuit also producing an output voltage in response to positive sequence components of the line voltage when the frequency varies from a nominal value, a frequency compensating circuit adapted to provide a voltage component which varies in phase with frequency, means for providing a voltage component of substantially fixed phase, and means for adding said voltage components vectorially to the output voltage of the filter circuit to substantially cancel any output voltage due to positive sequence components.

7. A negative sequence voltage sensing network for a three-phase alternating current line, said network comprising a filter circuit having a first capacitor and a first resistor connected in series across one phase of the line, a second resistor and a second capacitor connected in series across a second phase of the line, and means for combining the voltages across said first capacitor and second resistor to produce an output voltage in response to negative sequence components of the line voltage, the values of said capacitors and resistors being such that the voltages across the first capacitor and second resistor at a nominal frequency are equal and, respectively, lag and lead the corresponding phase voltages by thirty degrees, whereby the filter circuit has no output voltage due to positive sequence components of the line voltage at the nominal frequency but produces an output voltage in response to positive sequence components when the frequency varies from the nominal value, a frequency compensating circuit adapted to provide a voltage component which varies in phase with frequency, means for providing a voltage component of substantially fixed phase, and means for adding said voltage components vectorially to the output voltage of the filter circuit to substantially cancel any output voltage due to positive sequence components.

8. A negative sequence voltage sensing network for a three-phase alternating current line, said network comprising a circuit energized from two of the phase voltages of said line to produce an output voltage in response to negative sequence components of the line voltage, said filter circuit also producing an output voltage nearly in quadrature relation with the third phase voltage of the line in response to positive sequence components of the line voltage when the frequency varies from a nominal value, a frequency compensating circuit energized from said third phase voltage and including two parallel-connected branches each consisting of a resistor and capacitor in series, means for combining the voltages across the two last-mentioned resistors to obtain a voltage component which varies in phase position with frequency, the values of the last-mentioned resistors and capacitors being such that said voltage component is in phase with said third phase voltage at the nominal frequency and changes in phase position when the frequency varies, means for deriving a fixed reference voltage equal and opposite to said voltage component at the nominal frequency, and means for adding said voltage component and reference voltage to the output voltage of the filter circuit.

9. A negative sequence voltage sensing network for a three-phase alternating current line, said network comprising a filter circuit energized from two of the phase voltages of said line to produce an output voltage in response to negative sequence components of the line voltage, said filter circuit also producing an output voltage nearly in quadrature relation with the third phase voltage of the line in response to positive sequence components of the line voltage when the frequency varies from a nominal value, a frequency compensating circuit energized from said third phase voltage and including two parallel-connected branches each consisting of a resistor and capacitor in series, means for combining the voltages across the two last-mentioned resistors to obtain a voltage component which varies in phase position with frequency, the resistance of each of said last-mentioned resistors being equal to the reactance of the capacitor of the other parallel branch at the nominal frequency, whereby said voltage component is in phase with said third phase voltage at the nominal frequency and changes in phase position when the frequency varies, means for deriving a fixed reference voltage equal and opposite to said voltage component at the nominal frequency, and means for adding said voltage component and reference voltage to the output voltage of the filter circuit.

10. A negative sequence voltage sensing network for a three-phase alternating current line, said network comprising a filter circuit having a first capacitor and a first resistor connected in series across one phase of the line, a second resistor and a second capacitor connected in series across a second phase of the line, and means for combining the voltages across said first capacitor and second resistor to produce an output voltage in response to negative sequence components of the line voltage, said filter circuit also producing an output voltage nearly in quadrature relation with the third phase voltage of the line in response to positive sequence components of the line voltage when the frequency varies from a nominal value, a frequency compensating circuit energized from said third phase voltage and including two parallel-connected branches each consisting of a resistor and capacitor in series, means for combining the voltages across the two last-mentioned resistors to obtain a voltage component which varies in phase position with frequency, the values of the last-mentioned resistors and capacitors being such that said voltage component is in phase with said third phase voltage at the nominal frequency and changes in phase position when the frequency varies, means for deriving a fixed reference voltage equal and opposite to said voltage component at the nominal frequency, and means for adding said voltage component and reference voltage to the output voltage of the filter circuit.

11. A negative sequence voltage sensing network for a three-phase alternating current line, said network comprising a filter circuit having a first capacitor and a first resistor connected in series across one phase of the line, a second resistor and a second capacitor connected in series across a second phase of the line, and means for combining the voltages across said first capacitor and second resistor to produce an output voltage in response to negative sequence components of the line voltage, the values of said capacitors and resistors being such that the voltages across the first capacitor and second resistor at a nominal frequency are equal and, respectively, lag and lead the corresponding phase voltages by thirty degrees, whereby the filter circuit has no output voltage due to positive sequence components of the line voltage at the nominal frequency but produces an output voltage nearly in quadrature relation with the third phase voltage of the line in response to positive sequence components when the frequency varies from the nominal value, a frequency compensating circuit energized from said third phase voltage and including two parallel-connected branches each consisting of a resistor and capacitor in series, means for combining the voltages across the two last-mentioned resistors to obtain a voltage component which varies in phase position with frequency, the resistance of each of said last-mentioned resistors being equal to the resistance of the capacitor of the other parallel branch, at the nominal frequency, whereby said voltage component is in phase with said third phase voltage at the nominal frequency and changes in phase position when the frequency varies, means for deriving a fixed reference voltage equal and opposite to said voltage component at the nominal frequency, and means for adding said voltage component and reference voltage to the output voltage of the filter circuit.

References Cited in the file of this patent

UNITED STATES PATENTS

| | | |
|---|---|---|
| 2,456,976 | McConnell | Dec. 21, 1948 |
| 2,516,022 | Sonnemann | July 18, 1950 |
| 2,529,169 | McConnell | Nov. 7, 1950 |